United States Patent
Benkoski et al.

(10) Patent No.: US 9,550,855 B2
(45) Date of Patent: Jan. 24, 2017

(54) SELF-HEALING COATINGS

(75) Inventors: Jason J. Benkoski, Ellicott City, MD (US); Rengaswamy Srinivasan, Ellicott City, MD (US); Jeffrey P. Maranchi, Clarksburg, MD (US)

(73) Assignee: The Johns Hopkins University, Baltimore, MD (US)

( * ) Notice: Subject to any disclaimer, the term of this patent is extended or adjusted under 35 U.S.C. 154(b) by 926 days.

(21) Appl. No.: 13/083,819

(22) Filed: Apr. 11, 2011

(65) Prior Publication Data

US 2011/0293958 A1 Dec. 1, 2011

Related U.S. Application Data

(60) Provisional application No. 61/349,352, filed on May 28, 2010.

(51) Int. Cl.
*C08G 18/32* (2006.01)
*C08G 18/64* (2006.01)
(Continued)

(52) U.S. Cl.
CPC ....... *C08G 18/3228* (2013.01); *C08G 18/6423* (2013.01); *C08G 18/724* (2013.01); *C08G 18/755* (2013.01); *C09D 163/00* (2013.01); *C09D 175/04* (2013.01); *C08G 2150/90* (2013.01); *C08K 3/08* (2013.01); *C08K 9/10* (2013.01); *Y10T 428/12111* (2015.01); *Y10T 428/2933* (2015.01)

(58) Field of Classification Search
CPC ............ C08G 18/3228; C08G 18/6423; C08G 18/724; C08G 18/755; C08G 2150/90; Y10T 428/12111; Y10T 428/2933; C08K 3/08; C08K 9/10; C09D 163/00; C09D 175/04

See application file for complete search history.

(56) References Cited

U.S. PATENT DOCUMENTS 3,503,783 A * 3/1970 Evans .............................. 427/10
4,329,402 A    5/1982 Hyner et al.
(Continued)

FOREIGN PATENT DOCUMENTS

EP    1 634 932       3/2006
WO   WO 2007003879    1/2007
(Continued)

OTHER PUBLICATIONS

Kumar et al., Self-Healing Coatings for Steel, Progress in Organic Coatings 55 (2006) 24-253, Elsevier.
(Continued)

*Primary Examiner* — Kevin R Kruer
(74) *Attorney, Agent, or Firm* — Noah J. Hayward

(57) ABSTRACT

A metallic microcapsule containing a polymeric microcapsule having one or more polymeric precursors encapsulated therein; and a metallic shell enclosing a volume containing the polymeric microcapsule is disclosed. Also disclosed is a self-healing coating composition comprising (a) a film-forming binder; and (b) metallic microcapsules, the metallic microcapsules being the same or different and containing a polymeric microcapsule containing one or more polymeric precursors encapsulated therein; and a metallic shell enclosing a volume containing the polymeric microcapsule.

19 Claims, 1 Drawing Sheet

(51) Int. Cl.
    *C08G 18/72*    (2006.01)
    *C08G 18/75*    (2006.01)
    *C08K 3/00*     (2006.01)
    *C08K 9/10*     (2006.01)
    *C09D 163/00*   (2006.01)
    *C09D 175/04*   (2006.01)
    *C08K 3/08*     (2006.01)

(56) References Cited

U.S. PATENT DOCUMENTS

| | | | |
|---|---|---|---|
| 4,861,442 A * | 8/1989 | Tanaka et al. | 205/246 |
| 5,182,318 A * | 1/1993 | Savin | 523/216 |
| 5,393,567 A | 2/1995 | Wekenmann et al. | |
| 5,562,989 A | 10/1996 | Statz | |
| 6,075,072 A * | 6/2000 | Guilbert | C09D 5/08 |
| | | | 427/213 |
| 6,146,819 A * | 11/2000 | Furukawa | G03C 1/89 |
| | | | 430/204 |
| 6,420,052 B1 | 7/2002 | Keeney et al. | |
| 6,858,659 B2 | 2/2005 | White et al. | |
| 6,960,247 B2 | 11/2005 | Endo et al. | |
| 7,108,914 B2 | 9/2006 | Skipor et al. | |
| 7,192,993 B1 * | 3/2007 | Sarangapani | C09D 5/086 |
| | | | 427/213 |
| 7,342,057 B2 | 3/2008 | Kumar et al. | |
| 7,569,625 B2 | 8/2009 | Keller et al. | |
| 7,723,405 B2 | 5/2010 | Braun et al. | |
| 8,448,334 B2 * | 5/2013 | Perry | H02K 3/30 |
| | | | 174/120 R |
| 8,581,209 B2 * | 11/2013 | Oxley et al. | 250/459.1 |
| 8,680,176 B2 * | 3/2014 | Rawlins | B82Y 30/00 |
| | | | 523/201 |
| 2004/0009300 A1 | 1/2004 | Shimakura et al. | |
| 2007/0087198 A1 | 4/2007 | Dry | |
| 2007/0166542 A1 * | 7/2007 | Braun et al. | 428/402.21 |
| 2008/0081120 A1 | 4/2008 | Van Ooij et al. | |
| 2008/0152815 A1 | 6/2008 | Stephenson et al. | |
| 2009/0078153 A1 | 3/2009 | Shchukin et al. | |

FOREIGN PATENT DOCUMENTS

| | | |
|---|---|---|
| WO | WO 2008124391 | 10/2008 |
| WO | WO 2009115671 | 9/2009 |

OTHER PUBLICATIONS

Saauvant-Moynot et al; Self-Healing Coatings: An Alternative Route for Anticorrosion Protection; 63 (2008) 307-315, Elsevier.

Lvov et al., Halloysite Clay Nanotubes for Controlled Release of Protective Agents, ACS Publications, 2008, 2 (5), 814-820; DOI: 10.1021/nn800259q, May 27, 2008.

\* cited by examiner

SELF-HEALING COATINGS

CROSS-REFERENCE TO RELATED APPLICATIONS

This application claims the benefit of prior filed U.S. Provisional Application No. 61/349,352, filed May 28, 2010, the contents of which are incorporated by reference herein.

STATEMENT OF GOVERNMENTAL INTEREST

This invention was made with government support under contract number N00014-09-1-0383 awarded by the Office of Naval Research (ONR). The government has certain rights in the invention.

BACKGROUND OF THE INVENTION

1. Field of the Invention

The present invention generally relates to a self-healing coating using metallic microcapsules.

2. Description of the Related Art

The cost of corrosion is estimated to be at least $276 billion per year in the U.S. alone. A 2001 study commissioned by the Federal Highway Administration analyzed 26 industrial sectors to find that direct costs accounted for approximately 3.2% of the U.S. economy. Often overlooked in these numbers are the costs related to equipment downtime. For example, the time spent replacing or rehabilitating corroded equipment not only ties up valuable manpower, but also makes it necessary to maintain a reserve of excess capital equipment. With service rotations as short as 6 months, even a modest increase in service life can lead to significant savings.

The most common approach to preventing corrosion is to paint the surface with a protective coating. Typically, paints composed of an inorganic powder embedded within a polymer matrix have only limited ability to resist abrasion. Attempts to improve durability are ultimately constrained by the requirements that the coating be relatively thin (e.g., <100 µm) and easy to apply. While repainting and touch-ups can be performed as part of regular maintenance, many defects go unnoticed before significant damage occurs. Accordingly, self-healing coatings have been developed that autonomously repair scratches below some maximum width, thereby delaying the onset of corrosion and increasing the time between maintenance cycles.

The most common strategies utilized in developing self-healing polymer coatings are to supply energy to the system to form new bonds, or supply additional material to the damage zone. Supplying energy to the system could be as simple as heating a polymeric coating to achieve melt and reflow. Other examples include the use of heat to activate a reversible Diehls-Alder reaction, applying UV light to initiate the polymerization of pendant vinyl groups, and the use of hydrogen bonded polymers near their effective melting temperature. The advantage of energy activation is the potential for unlimited healing capacity. However, heating is logistically impractical for large objects, and UV activation may not provide complete healing if pigments in the coating interfere with light absorption.

Another approach achieves self-healing by supplying additional material to the damage zone. For example, one technique for delivering a reservoir of fresh material to a scratch include the use of embedded polymer microcapsules incorporated into paints and primers. The microcapsules release the self-healing compound or compounds, most commonly as liquids, when the coating system is damaged. However, appropriate materials should be used to fabricate the microcapsule and its contents, else it may "deploy" before the coating is applied or, upon application, spontaneously deploy improperly, i.e., without a physical compromise of the coating such as abrasion or nicking. Further, unless the microcapsule is compatible with both its contents (the encapsulated repair compound) and its surrounds (the solvent), the "application" life of the resultant mixed product may be less than desirable.

Accordingly, there is a continued need for improved self-healing coatings that can be made in a simple, cost efficient manner.

SUMMARY OF THE INVENTION

In accordance with one embodiment of the present invention, there is provided a metallic microcapsule comprising a polymeric microcapsule containing one or more polymeric precursors encapsulated therein; and a metallic shell enclosing a volume containing the polymeric microcapsule.

In accordance with a second embodiment of the present invention, there is provided a metallic microcapsule suitable for adding to a self-healing coating composition to be cured at ambient temperature to facilitate self-healing of the resultant self-healing coating after curing thereof, the metallic microcapsule comprising a polymeric microcapsule containing one or more polymerizable monomers encapsulated therein; and a metallic shell enclosing a volume containing the polymeric microcapsule; whereupon application of the resultant self-healing coating composition to a substrate and curing of the self-healing coating thereon, and further whereupon damage to the self-healing coating results in rupture of the metallic microcapsule and deployment of the one or more polymerizable monomers to fill and seal the compromised volume within the coating adjacent to the metallic microcapsule.

In accordance with a third embodiment of the present invention, there is provided a self-healing coating composition comprising (a) one or more film-forming binders; and (b) metallic microcapsules, the metallic microcapsules being the same or different and comprising a polymeric microcapsule containing one or more polymeric precursors encapsulated therein; and a metallic shell enclosing a volume containing the polymeric microcapsule.

In accordance with a fourth embodiment of the present invention, there is provided a coated article comprising: a substrate; a self-healing coating adjacent the substrate, the self-healing coating having metallic microcapsules, the metallic microcapsules being the same or different and comprising a polymeric microcapsule containing one or more polymeric precursors encapsulated therein; and a metallic shell enclosing a volume containing the polymeric microcapsule.

In accordance with a fifth embodiment of the present invention, there is provided a method for preparing a self-healing coating composition that repairs itself after application and curing thereof, the method comprising: (a) providing one or more film-forming binders; (b) providing the same or different metallic microcapsules compatible with the one or more liquid film-forming binders and comprising polymeric microcapsules containing one or more polymeric precursors encapsulated therein; and a metallic shell enclosing a volume containing the polymeric microcapsule; (c) mixing the metallic microcapsules with the one or more film-forming binders such that the metallic microcapsules are interspersed throughout the one or more film-forming binders to obtain a self-healing coating composition.

In accordance with a sixth embodiment of the present invention, there is provided a method for producing a self-healing coating upon a substrate, the method comprising (a) providing a one or more film-forming binders; (b) providing the same or different metallic microcapsules compatible with the non-self healing coating composition and comprising a polymeric microcapsule containing one or more polymeric precursors encapsulated therein; and a metallic shell enclosing a volume containing the polymeric microcapsule; (c) mixing the metallic microcapsules into the one or more film-forming binders such that the metallic microcapsules are interspersed throughout the one or more film-forming binders to obtain a liquid self-healing coating composition; (d) applying the self-healing coating composition to the substrate; and (e) permitting the applied self-healing coating to cure.

The metallic microcapsules of the present invention are particularly suitable for adding to one or more film-forming binders to form a self-healing coating composition to be cured at ambient temperature to facilitate self-healing of the resultant coating after being damaged. For example, when the applied self-healing coating is damaged, e.g., by abrasion through the coating to the substrate on which it is applied, the metallic microcapsules burst, thereby releasing the one or more polymeric precursors contained therein. This initiates a self-healing process, i.e., the damaged area of the substrate is covered and repaired. This provides a "self-healing" ability to the coating which protects the substrate even after the coating is damaged. Further, when the one or more polymeric precursors such as an isocyanate are exposed to moisture in the air, it is believed that the one or more polymeric precursors will polymerize thereby forming a polyurethane foam which will expand and fill the crack or fissure. The ensuing volume expansion allows the polymeric precursors to heal a larger scratch for a given volume of released polymeric precursor.

In addition to the self-healing properties, the self-healing coating also provides galvanic protection, which is provided by the metallic shell of the metallic microcapsule. For example, if the repair of the scratch is incomplete, the metallic shell can act as a sacrificial anode to galvanically protect an exposed metal substrate, e.g., steel. The metallic shell also hermetically seals the polymeric microcapsule to achieve a relatively long shelf-life without resorting to a two-part curing system, while providing strength and stiffness to the microcapsule to compensate for the loss of mechanical properties caused by the entrained resin.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF PREFERRED EMBODIMENT(S)

Figure 1:
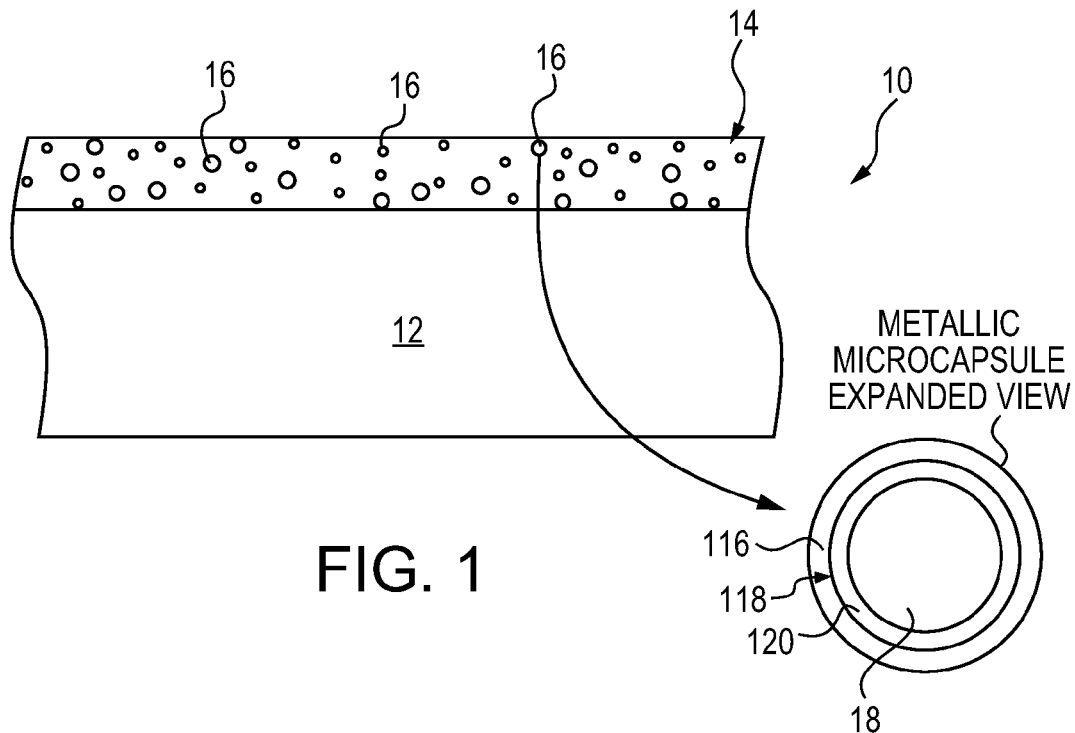
FIG. 1 is a general sectional view of a coated article having a coating according to the present invention, and an exploded view of a metallic microcapsule in the coating according to the present invention.

One aspect of the present invention is directed to metallic microcapsules comprising a polymeric microcapsule containing one or more polymeric precursors and optional water-immiscible composition comprising a substantially water-immiscible luminescent or colorimetric material encapsulated therein; and a metallic shell enclosing a volume containing the polymeric microcapsule. The metallic microcapsules are particularly suitable for adding to a liquid self-healing coating composition to be cured at ambient temperature to facilitate self-healing of the resultant self-healing coating after its application to a substrate and subsequent curing thereon, wherein damage to the self-healing coating results in rupture of the metallic microcapsule and deployment of the one or more polymeric precursors and optional water-immiscible composition comprising a substantially water-immiscible luminescent or colorimetric material to fill and seal the compromised volume within the coating adjacent to the metallic microcapsule.

In general, the microcapsule can be formed employing conventional microcapsulating methods. In one preferred embodiment, the microcapsule is produced from an oil-in-water emulsion which contains one or more polymeric precursors, then causing interfacial polymerization to occur, so as to form microcapsules with a liquid interior (i.e., the one or more polymeric precursors and optional substantially water-immiscible luminescent or colorimetric material) and thin polymer shell, i.e., a polymeric microcapsule. In the interfacial polymerization method, an oil phase containing a polymer-forming resin is mixed with an aqueous phase in which a water-soluble polymer is dissolved in water followed by emulsifying and dispersing by means such as a homogenizer followed by adding one or more crosslinking agents, thereby a polymer forming reaction is caused at an oil/water interface, whereby a microcapsule wall made of the polymer-forming resin is formed. In the interfacial polymerization method, microcapsules having uniform particle diameters can be formed in a relatively short time period.

The oil phase is prepared from a mixture of one or more polymer-forming resins and optional water-immiscible composition comprising a substantially water-immiscible luminescent or colorimetric material. Suitable polymer-forming resins include any polymer-forming resins known in the art for making microcapsules. Representative examples of a polymer-forming resin include one or more of polyvalent isocyanate compounds. Representative examples of polyvalent isocyanate compounds include isocyanates such as isophorone diisocyanate, m-phenylenediisocyanate, p-phenylenediisocyanate, 2,6-tolylenediisocyanate, 2,4-tolylenediisocyanate, naphthalene-1,4-diisocyanate, diphenylmethane-4,4'-diisocyanate, 3,3'-diphenylmethane-4,4'-diisocyanate, xylene-1,4-diisocyanate, 4,4'-diphenylpropanediisocyanate, trimethylenediisocyanate, hexamethylenediisocyanate, propylene-1,2-diisocyanate, butylene-1,2-diisocyaate, cyclohexylene-1,2-diisocyanate, and cyclohexylene-1,4-diisocyanate; triisocyanates such as 4,4',4"-triphenylmethanetriisocyanate, and toluene-2,4,6-triisocyanate; tetraisocyanates such as 4,4'-dimethylphenylmethane-2,2', and 5,5'-tetraisocyanate; and isocyanate prepolymers such as poly[(phenyl isocyanate)-co-formaldehyde], an adduct of hexanemethylenediisocyanate and trimethylolpropane, an adduct of 2,4-tolylenediisocyanate and trimethylolpropane, an adduct of xylene diisocyanate and trimethylolpropane, and an adduct of tolylene diisocyanate and hexanetriol, and the like. If desired, two or more compounds can be used together as necessary.

If necessary, the oil phase can contain one or more additional additives such as dispersants, surfactants and the like and mixtures thereof. Examples of dispersants include water-insoluble pigment dispersants such as a copolymer with acidic groups marketed by Byk Chemie under the trade name Disperbyk 110, and a high molecular weight block copolymer with pigment affinic groups, marketed by Byk Chemie under the trade name Disperbyk 163 and the like. Examples of surfactants include Air Products DABCO DC197 silicone-based surfactant and the like.

A suitable water-immiscible composition comprising a substantially water-immiscible luminescent or colorimetric material for encapsulation in the microcapsule includes any luminescent or colorimetric material known in the art. Representative examples of such luminescent or colorimetric material are Nile red, Nile blue, rhodamine, fluorescein, 9,10-diphenylanthracene, rubrene, tetracene, 9,10-bis(phenylethynyl)anthracene, and the like and mixtures thereof. In one embodiment, the substantially water-immiscible luminescent or colorimetric material is mixed with the one or more polymeric precursors (i.e., polymerizable monomers) to obtain a water-immiscible composition.

In general, the concentration of the polymer forming resin contained in the oil phase can range from about 50 to about 100 wt. %, based on the total weight of the oil solution.

The aqueous phase in which the oil phase is emulsified and dispersed will contain water and a surface active water-soluble polymer. Suitable surface active water-soluble polymer compounds include polyvinyl alcohol and its modified substances, polyacrylic acid amide and its derivatives, ethylene-vinyl acetate copolymer, styrene-maleic anhydride copolymer, ethylene-maleic anhydride copolymer, isobutylene-maleic anhydride copolymer, polyvinylpyrolidone, ethylene-acrylic copolymer, vinyl acetate-acrylic copolymer, carboxylmethyl cellulose, methyl cellulose, casein, gelatin, starch derivatives, gum arabic, sodium alginate, and the like. In one preferred embodiment, the water-soluble high polymers do not react with isocyanate compounds or have a relatively low reactivity therewith. For example, like gelatin, a water-soluble high polymer compound having a reactive amino group in the molecular chain thereof must be previously made nonreactive.

In general, the concentration of the water-soluble high polymer compound contained in the aqueous phase can range from about 0.1 to about 10 wt. %, based on the total weight of the aqueous solution.

As discussed hereinabove, the microcapsule is obtained by (a) forming an oil solution from (i) one or more polymer-forming resins, and optionally (ii) a water-immiscible composition comprising a substantially water-immiscible luminescent or colorimetric material to obtain an oil solution; (b) adding to the oil solution an aqueous solution containing a water-soluble polymer and forming an oil-in-water emulsion, e.g., by means of a homogenizer or the like; (c) adding one or more crosslinking agents to the emulsion; and (d) reacting the one or more polymer-forming resins and the one or more crosslinking agents, thereby producing a plurality of microcapsules having a capsule wall, with at least a major portion of one or more polymeric precursors and optional water-immiscible composition comprising a substantially water-immiscible luminescent or colorimetric material encapsulated within the capsule wall of the microcapsules. In general, the encapsulating may be carried out without using an organic solvent.

In one embodiment, the one or more polymeric precursors are unreacted polymer-forming resins. In other words, in reacting the one or more polymer-forming resins and the one or more crosslinking agents, an excess of the one or more polymer-forming resins is employed to provide unreacted polymer-forming resin(s), i.e., the one or more polymeric precursors, encapsulated in the microcapsule. In another embodiment, the one or more polymeric precursors are different than the polymer-forming resin(s). In this embodiment, one or more polymeric precursors are added to the emulsion and then encapsulated in the resulting microcapsule. Suitable polymeric precursors include by way of example, acrylate monomers, methacrylate monomers, vinyl pyridine monomers, vinyl ether monomers, acrylamide monomers, methacrylamide monomers, pyrrolidone monomers, styrene monomers, nylon monomers, polyamines, e.g., those obtained from the reaction of an acid chloride with amine, isocyanates such as isocyanates, diisocyanates and triisocyanates and the like and mixtures thereof.

Useful cross-linking agents include, but are not limited to, amines, alcohols and the like and mixtures thereof. Suitable amines as cross-linking agents include aliphatic and cycloaliphatic primary and secondary diamines and polyamines. Representative examples of such amines include 1,2-diaminoethane, diethylenetriamine, triethylenetetramine, bis-(3-aminopropyl)-amine, bis-(2-methylaminoethyl)methylamine, 1,4-diaminocyclohexane, 3-amino-1-methylaminopropane, N-methyl-bis-(3-aminopropyl)amine, 1,4-diamino-n-butane, 1,6-diamino-n-hexane, polyethylenimine, guanidine carbonate and the like and mixtures thereof. Suitable alcohols as cross-linking agents include primary or secondary aliphatic dialcohols or polyalcohols. Representative examples of such alcohols include ethanediol, 1,2-propanediol, 1,3-propanediol, 1,4-butanediol, 1,5-pentanediol, 1,6-hexanediol, glycerol, diethylene glycol, poly(vinyl alcohol), and the like and mixtures thereof. Also useful as cross-linking agents include aliphatic aminoalcohols such as, for example, triethanolamine.

If desired, a catalyst to harden the polymer precursor when exposed to moisture during rupture of the metallic microcapsule may be encapsulated in the microcapsule. The catalyst may be, for example, a Grubbs catalyst, a radical initiator, or a combination thereof.

The polymeric microcapsules (primary shells) will typically have an average diameter of about 1 to about 100 µm. In one embodiment, the shells of the polymeric microcapsules can have an average thickness of about 0.5 to about 10 µm. The microcapsules can be of any shape, e.g., spherical, circular and the like. However, other shapes, such as filaments, may be used also, with a concomitant loss of efficiency. In one embodiment, the polymeric microcapsule is rod shaped and will have an average diameter of about 1 to about 100 µm, and a macroscopic length greater than about 1 mm.

A metallic shell is then formed over the microcapsule to provide a metallic shell enclosing a volume containing the polymeric microcapsule. The metallic shell is formed by electroplating a layer of metal on the microcapsule. The layer of metal can be plated onto the microcapsule by electroless plating. In general, electroless plating is carried out until a thickness of about 0.5 to about 10 µm of the metallic shell is achieved. The metal can be any metal capable of providing galvanic protection to a metal substrate such as steel. Representative examples of such metals include aluminum, nickel, cadmium, zinc and mixtures thereof. In one embodiment, the metal is a mixture of zinc and nickel. The composition is chosen so that the nickel/zinc alloy acts as an anode with respect to steel.

The metallic microcapsules can have an overall average diameter of from about 1 to about 120 µm. In one embodiment, the metallic microcapsules can have an overall average diameter of from about 25 to about 50 µm. As discussed above, the microcapsules can be of any shape, e.g., spherical, circular, rod shaped and the like. However, other shapes, such as filaments, may be used also, with a concomitant loss of efficiency.

The foregoing metallic microcapsules are added to one or more film forming binders to form a liquid self-healing coating composition. The term "film forming binder" means a nonencapsulated constituent of the liquid self-healing coating composition which holds other parts of the composition in a continuous layer after application to a selected surface of a substrate. The film-forming binders may be liquid or solid, depending on the particular application. The one or more film-forming binders may comprise a protective coating that would serve the purpose of protecting a substrate but not have the self-healing properties of the coating of the present invention. This non-self healing protective coating composition may be one of a number of commercially available products such as, for example, primer paints, topcoat paints, "one coat" or "self-priming" paints, varnishes, lacquers, polyurethane finishes, shellacs, waxes, polishes, "one step" finishing preparations for wood, metal, or synthetic materials, and the like and combinations thereof. Suitable paint primers include polyurethanes, oil-based enamels, enamel undercoater, latex acrylics, acrylic formulations, epoxy formulations and the like. Suitable topcoat and self-priming paints include polyurethanes, oil-based enamels, enamels, latex acrylics, acrylic formulations, epoxy formulations and the like.

If desired, the self-healing coating composition can contain various additives known in the art. Representative examples of such additives include corrosion inhibitors, flow enhancing agents, and the like and mixtures thereof.

FIG. 1 illustrates a coated article 10 according to the present invention. The article 10 generally includes a substrate 12 and a coating 14 having metallic microcapsules 16. In one embodiment, substrate 12 is a metal part. In one embodiment, a suitable metal substrate 12 is representative of a vehicle such as a humvee, truck, tank and the like, or a vehicle component such as a spring or suspension component which is typically subjected to a high corrosion environment. In another embodiment, a suitable metal substrate 12 is a bridge. The type of substrate 12, such as a metal substrate or the form in which it is provided for treatment in accordance with the invention, is not limited within this invention.

The coating 14 is typically a paint or undercoating. The coating 14 is applied to the substrate 12 by conventional processes such as spraying or dipping. The coating 14 contains a sufficient quantity of the metallic microcapsules 16. Although a single coating is illustrated it will be understood that a multiple of coating 14 layers are contemplated.

In an embodiment, each of the metallic microcapsules 16 (as depicted in the exploded view of 16 in FIG. 1) includes a metallic shell 116 and a polymeric microcapsule 118 within the metallic shell. The polymeric microcapsule 118 includes a polymeric shell (or wall 120) and, within the polymeric shell, a polymeric precursor 18 and an optional water-immiscible composition. The metallic microcapsules 16 are manufactured to contain the polymeric precursor 18 in a fluid state. The metallic microcapsules 16 are retained in the coating 14 to form a matrix of hardened coating 14 and metallic microcapsules 16. If desired, a mix of different metallic microcapsules 16 can be incorporated into coating 14 such that a multiple of properties can be incorporated directly into the coating 14.

Figure 2:
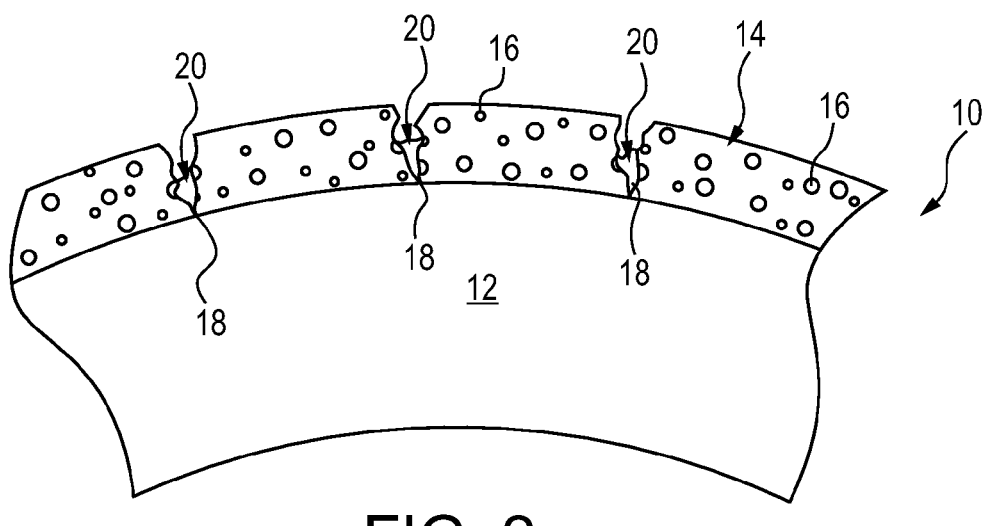
FIG. 2 is a general sectional view of a coated article according to the present invention while being flexed.

Referring to FIG. 2, article 10 is shown in a flexed condition. Continual flexing of the coating article 10 may cause the coating to crack and form fissures 20 which can extend to the substrate 12. These fissures 20 may also be caused in a more immediate fashion by direct contact with an object that causes a scratch or break in the coating 14. Typically such a crack exposes the substrate 12 and leaves the substrate 12 unprotected against the environment and resulting corrosion.

According to the present invention, however, the cracking of the coating 14 also breaks open the metallic microcapsules 16 adjacent the fissure 20. The broken metallic microcapsules 16 release the polymeric precursor 18 contained therein. Because the metallic microcapsules 16 release the polymeric precursor 18 in the fluid state the polymeric precursor 18 flows into the fissure 20 and fills the exposed substrate 12. This provides a "self-healing" ability to the coating which protects the substrate 12 even after the coating 14 is damaged.

The present invention therefore provides a self-healing coating which may increase the anti-corrosion protection of a metal substrate while maintaining a relatively inexpensive coating application process commonly practiced in the art. The following examples are provided to enable one skilled in the art to practice the invention and are merely illustrative of the invention. The examples should not be read as limiting the scope of the invention as defined in the claims.

In the examples, the following abbreviations are used.
IPDI=isophorone diisocyanate
PPI=polyphenylene isocyanate, Mn 400 g/mol
MIL-P=purified resin of MIL-P-26915 zinc-filled primer
DETA=diethylenetriamine
PEI=polyethylenimine, Mw 750,000 g/mol, 50% solids
PAA Solution=poly(acrylic acid), M, 100,000 g/mol, 35% solids I. Preparation of Microcapsules Gum Arabic Solution: 50 g Gum Arabic was mixed with 292 g NaCl into 1 L of MilliQ water to give a 5% Gum Arabic 5 M NaCl solution.

Polyurethane Resin: 0.001 g Nile Red was mixed with 13 g IPDI, 2 g PPI, 2 g Dabco DC197, 2 g Disperbyk 110, and 1 g MIL-P into a 50 mL beaker. The mixture was stirred and sonicated until uniform (65% IPDI, 10% PPI, 5% MIL-P, 10% Dabco DC197, 10% Disperbyk 110, 0.005% Nile Red).

Crosslinker 1: 3 g of DETA was mixed with 17 g of 0.1 g/ml Gum Arabic solution and 5 M NaCl until uniform (15% DETA).

Crosslinker 2: 2 mL of 50 wt % PEI was mixed in 98 mL of MilliQ water to give a 1% solution of high molecular weight PEI.

Emulsion: 80 g Gum Arabic solution was poured in 5 M NaCl and 20 g Polyurethane Resin in a 250 mL Erlenmeyer flask at 70° C., then stirred at 1000 RPM with an IKA mechanical stirrer.

The Crosslinker 1 was poured into the emulsion, and stifling was continued at room temperature and 1000 RPM for 20 minutes to obtain microcapsules.

The microcapsules were purified by washing twice with MilliQ water and then 100 mL of the Crosslinker 2 solution was added with PEI. The solution was allowed to sit overnight while the PEI and water slowly reacted to form a hard outer shell.

II. Electroplating Procedure

PAA Solution: 57.14 g of the 35 wt % PAA solution was mixed with 1 L of a 100 mM PBS buffer to obtain a 2 wt % PAA solution. The pH was adjusted manually to 7.4 by adding amounts of NaOH. A 100 mM PBS buffer was prepared by dissolving 1.42 g of $KH_2PO_4$ (10.41 mmol) and 5.62 g of $NaHPO_4$ (39.59 mmol) into 0.5 L of MilliQ water. The pH was adjusted with either HCl or NaOH.

SnCl$_2$ Solution: A fresh batch of 10 g/L SnCl$_2$ was prepared by mixing 1 g SnCl$_2$, 0.5 mL concentrated HCl, and 100 mL MilliQ water. The solution was not allowed to sit more than a few hours before use.

PdCl$_2$ Solution: A stock solution was prepared by mixing 0.5 g PdCl$_2$ and 4 mL concentrated HCl into 1 L MilliQ water.

The microcapsules were washed with MilliQ water twice, and then once with 100 mM PBS buffer (pH 7.4).

The microcapsules were added to 100 mL of PAA solution, and allowed adsorption to take place over the course of 10 minutes while they settle. After about 10 minutes of soaking the microspheres with poly(acrylic acid), wash once with 100 mM PBS buffer and then twice more with 100 mL MilliQ water. After about 10 minutes of soaking microspheres with SnCl$_2$, the microspheres were washed three times with MilliQ water.

The microspheres were then soaked in a 0.5 g/L PdCl$_2$ stock solution and after 10 minutes they were washed 4 times with MilliQ water. After decanting, 20 g of microcapsules were placed into 200 mL of Ni/Zn plating bath.

Acidic Nickel Plating Bath Formulation (75 mol % Ni, 25 mol % Zn)

| Reagent | MW (g/mol) | pKa | [g/L] | [M] |
|---|---|---|---|---|
| Nickel Sulfate hexahydrate | 262.85 | NA | 22.4 | 0.0852 |
| Zinc Sulfate heptahydrate | 287.56 | NA | 8.2 | 0.0285 |
| Sodium hypophosphite | 87.98 | NA | 100.0 | 1.137 |
| Lactic Acid | 90.08 | 3.86 | 25.4 | 0.282 |
| DL-Malic Acid | 134.09 | 3.4, 5.13 | 4.0 | 0.0298 |
| Tergitol NP-9 | NA | NA | 0.0030 | NA |
| Sodium Acetate | 82.03 | 4.75 | 8.5 | 0.104 |
| Ammonia 4.6N | 17.031 | NA | NA | NA |

*Will need ~60 mL of Ammonia to bring the pH to around 4.7

The plating bath was heated to 60° C., and allowed plating to occur for at least 1 hour until a thickness of 1.5 microns was achieved. When plating was complete, the metallic microspheres were filtered with a 10 μm nylon filter and washed several times with water. The vacuum was continued for about 10 minutes after filtration to dry the microcapsules. The metallic microcapsules were then freeze dried. The resulting metallic microcapsules had an average diameter of 39 microns.

III. Coating Composition

A coating composition was prepared by adding 1 part of the thus obtained metallic microcapsules to 3 parts of MIL-P-26915 primer resin in which all filler was removed from the primer.

IV. Water Immersion Testing

A 3×6 steel substrate was coated with the coating composition until a thickness of 150 μm was achieved. Next, scratches of ⅛", 1/32", 1/64", 3 mil were made to the panels. The scratched panels were immersed in deionized water at 100° F. overnight. The panels were then removed from the water and evaluated for rust A rust score was given by visual inspection according to the following:

0=100% rust across scratch, worst performance
1=75% rust across scratch
2=50%
3=25%
4=no rust, best possible performance The results of the testing are set forth below in Table 1.

TABLE 1

| Sample Name | Scratch Width (in.) | | | | | Avg. Rust Score |
|---|---|---|---|---|---|---|
| | 0.125 | 0.032 | 0.016 | 0.014 | 0.003 | |
| CARC Control | 1 | 3 | 3 | 0 | 2 | 1.8 |
| Zinc Control | 4 | 4 | 4 | 4 | 4 | 4 |
| Zn0/dry | 2 | 0 | — | 4 | 4 | 2.5 |
| Zn5/dry | 1 | 1 | — | 0 | 3 | 1.25 |
| Zn14/dry | 0 | 0 | — | 0 | 0 | 0 |
| Zn23/dry | 1 | 0 | — | 1 | 3 | 1.25 |
| Zn33/dry | 3 | 0 | — | 1 | 3 | 1.75 |
| Zn0/1 hr | 1 | 1 | 2 | 0 | 1 | 1 |
| Zn5/1 hr | 1 | 2 | 3 | 4 | 4 | 2.8 |
| Zn15/1 hr | 3 | 1 | 2 | 0 | 3 | 1.8 |
| Zn25/1 hr | 2 | 0 | 1 | 0 | 3 | 1.2 |
| Zn33/1 hr | 1 | 1 | 0 | 0 | 4 | 1.2 |
| Zn35/1 hr | 1 | 0 | 1 | 0 | 3 | 1 |
| Zn0/3 hr | 3 | 4 | 4 | 3 | 4 | 3.6 |
| Zn5/3 hr | 2 | 0 | 1 | 0 | 4 | 1.4 |
| Zn15/3 hr | 2 | 2 | 3 | 2 | 2 | 2.2 |
| Zn25/3 hr | 4 | 3 | 3 | 4 | 4 | 3.6 |
| Zn35/3 hr | 3 | 2 | 0 | 0 | 2 | 1.4 |
| Zn25/1 hr | 3 | 0 | 0 | 0 | 2 | 1 |
| Zn25/2 hr | 4 | 3 | 4 | 3 | 4 | 3.6 |
| Zn25/2.5 hr | 2 | 1 | 0 | 2 | 4 | 1.8 |
| Zn25/3 hr | 4 | 3 | 3 | 4 | 4 | 3.6 |
| Zn25/4 hr | 1 | 0 | 0 | 0 | 4 | 1 |

For each sample name ZnXX refers to the concentration of Zn in the plating bath, where Zn25 means that the plating bath had 25% Zn relative to the total concentration of nickel and zinc combined. The end of the sample name "/Xhr" refers to the length of the plating time. For example, Zn25/3 hr means that a 25% zinc sample was plated for 3 hours. Finally, the word "dry" at the end of the sample name means that the microcapsules were completely solid polymer, with no liquid resin inside. The "dry" samples were all plated for 1 hour.

Unfortunately, batch-to-batch variation also precluded the ability to draw many firm conclusions from the water resistance data. A linear regression fit did show, however, that the corrosion protection was best for intermediate plating times and worst for intermediate scratch widths. The 0.003 in. and 0.125 in. scratches healed relatively well. Overall there was less corrosion in the self-healing coatings than in the chemical agent resistant coatings (CARC) that are typically used by the military. The concentration of Zn in the metal shell was not statistically correlated to the amount of rusting in this data.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A self-healing coating composition, comprising:
   (a) one or more film-forming binders; and
   (b) metallic microcapsules, the metallic microcapsules being the same or different and comprising (i) a polymeric microcapsule encapsulating one or more polymeric precursors in a liquid state therein; and (ii) a metallic shell enclosing a volume containing the polymeric microcapsule; said metallic shell comprises a metal comprising zinc; said one or more polymeric precursors encapsulated in the polymeric microcapsule being configured to form a solidified reaction product of a polymeric material when exposed to moisture upon rupture of the metallic microcapsule;

wherein the metallic shell of each of the metallic microcapsules are present in the self-healing composition at an amount sufficient to provide galvanic protection to an exposed metal surface.

2. The self-healing coating composition of claim 1, wherein the one or more film forming binders are selected from the group consisting of epoxy resins, polyester resins, polyurethane resins, polyvinylfluorodiene resins, alkyl resins, acrylic resins and nylon.

3. The self-healing coating composition of claim 1, wherein the one or more film forming binders are a paint primer selected from the group consisting of polyurethanes, oil-based enamels, enamel undercoaters, latex acrylics, acrylic formulations and epoxy formulations.

4. The self-healing coating composition of claim 1, wherein the one or more film forming binders are a topcoat selected from the group consisting of polyurethanes, oil-based enamels, enamels, latex acrylics, acrylic formulations and epoxy formulations.

5. The self-healing coating composition of claim 1, wherein the polymeric microcapsules comprise a polyurethane, the metallic shell comprises zinc and nickel, and the polymeric precursor comprises an isocyanate.

6. The self-healing coating composition of claim 1, wherein the polymeric microcapsules further contain a substantially water-immiscible luminescent or colorimetric material encapsulated.

7. The self-healing coating composition of claim 1, wherein the metal comprises a mixture of zinc and at least one additional metal selected from the group consisting of aluminum, nickel, and cadmium.

8. The self-healing coating composition of claim 1, wherein the metal comprises from 0 mol % to 75 mol % of nickel and from 25 mol % to 100 mol % zinc.

9. The self-healing coating composition of claim 1, wherein the metallic shell comprises a thickness from 0.5 microns to 10 microns.

10. The self-healing coating composition of claim 9, wherein the metallic shell comprises a thickness of 1.5 microns.

11. The self-healing coating composition of claim 1, wherein the metallic shell of each of the metallic microcapsules define a sacrificial anode within the self-healing coating composition to provide galvanic protection to the exposed metal surface.

12. The self-healing coating composition of claim 11, further comprising one or more corrosion inhibitors.

13. The self-healing coating composition of claim 12, wherein the one or more corrosion inhibitors is encapsulated in the polymeric microcapsule.

14. A coated article comprising:
(a) a metal substrate;
(b) a self-healing coating according to claim 1 being adjacent the substrate.

15. The coated article of claim 14, wherein the metal substrate is a vehicle or component thereof, or a bridge.

16. A method of providing corrosion protection for an exposed metal surface, comprising:
(a) providing a self-healing coating on a substrate to form a coated metal surface, the self-healing coating comprises (i) one or more film-forming binders and (ii) a sacrificial anode comprising a plurality of metallic microcapsules, wherein the plurality of metallic microcapsules comprise a polymeric microcapsule encapsulating one or more polymeric precursors in a liquid state and a zinc-containing metallic shell enclosing a volume containing the polymeric microcapsule; said one or more polymeric precursors encapsulated in the polymeric microcapsule being configured to form a solidified reaction product of a polymeric material when exposed to moisture upon rupture of the metallic microcapsule; wherein the metallic shell of each of the metallic microcapsules are present in the self-healing coating at an amount sufficient to provide galvanic protection to said exposed metal surface;
(b) subsequent to a metal-exposing event providing the exposed metal surface having an exposed area, allowing at least a portion of the metallic microcapsules to rupture and allowing the one or more polymeric precursors to flow into and seal the exposed area; and
(c) galvanically protecting the exposed metal surface via the sacrificial anode comprising the plurality of metallic microcapsules prior to and during the step of allowing the one or more polymeric precursors to flow into and seal the exposed area.

17. The method of claim 16, wherein the self-healing coating further comprises one or more corrosion inhibitors.

18. The method of claim 17, wherein the one or more corrosion inhibitors is encapsulated in the polymeric microcapsule.

19. The method of claim 16, further comprising manufacturing the self-healing coating, including an electroplating step comprising electroplating the zinc-containing metallic shell enclosing the polymeric microcapsule.

* * * * *